(12) United States Patent
Gollnick

(10) Patent No.: US 12,497,948 B2
(45) Date of Patent: Dec. 16, 2025

(54) METHOD FOR COMPUTER-IMPLEMENTED CONTROLLING OF ONE OR MORE WIND TURBINES IN A WIND FARM

(71) Applicant: Siemens Gamesa Renewable Energy A/S, Brande (DK)

(72) Inventor: Bert Gollnick, Hamburg (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 511 days.

(21) Appl. No.: 17/911,465

(22) PCT Filed: Mar. 4, 2021

(86) PCT No.: PCT/EP2021/055525
§ 371 (c)(1),
(2) Date: Sep. 14, 2022

(87) PCT Pub. No.: WO2021/185594
PCT Pub. Date: Sep. 23, 2021

(65) Prior Publication Data
US 2023/0100321 A1   Mar. 30, 2023

(30) Foreign Application Priority Data
Mar. 19, 2020   (EP) .................................... 20164173

(51) Int. Cl.
*F03D 7/04*   (2006.01)
*F03D 7/02*   (2006.01)

(52) U.S. Cl.
CPC ........... *F03D 7/048* (2013.01); *F03D 7/0264* (2013.01); *F03D 7/045* (2013.01); *F03D 7/0204* (2013.01);
(Continued)

(58) Field of Classification Search
CPC .... F03D 7/0204; F03D 7/0224; F03D 7/0264; F03D 7/045; F03D 7/046; F03D 7/048;
(Continued)

(56) References Cited

U.S. PATENT DOCUMENTS 8,332,077 B2 * 12/2012 Kondo ...................... H02P 9/04
700/297
8,527,453 B2 * 9/2013 Garate .................. F03D 7/0224
706/62
(Continued)

FOREIGN PATENT DOCUMENTS

CN           1975155 A     6/2007
CN         107882679 A     4/2018
(Continued)

OTHER PUBLICATIONS

International Search Report & Written Opinion for PCT/EP2021/055525, mailed on Jun. 24, 2021.

*Primary Examiner* — Nathaniel E Wiehe
*Assistant Examiner* — Jason G Davis
(74) *Attorney, Agent, or Firm* — Schmeiser, Olsen & Watts, LLP

(57) ABSTRACT

A method for computer-implemented controlling of wind turbines in a wind farm is provided. The wind farm includes an upstream first and a downstream second wind turbines, wherein the following steps are performed: i) obtaining environmental data and stress data of the first wind turbine, the environmental data and the stress data being taken; ii) determining a status information indicating whether or not a predetermined event is present at the time of taking the data, wherein the predetermined event requires immediate controlling of the first wind turbine; iii) broadcasting a message which contains environmental data and a timestamp as event information; iv) evaluating the event information whether or not the predetermined event at the first wind turbine will hit
(Continued)

the second wind turbine; v) generating a control command for controlling the second wind turbine in case the evaluation holds that the predetermined event will hit the second wind turbine.

14 Claims, 2 Drawing Sheets

(52) U.S. Cl.
CPC ............ *F03D 7/0224* (2013.01); *F03D 7/046* (2013.01); *F05B 2270/32* (2013.01); *F05B 2270/321* (2013.01); *F05B 2270/322* (2013.01); *F05B 2270/331* (2013.01); *F05B 2270/709* (2013.01)

(58) Field of Classification Search
CPC ............ F05B 2270/32; F05B 2270/321; F05B 2270/322; F05B 2270/331; F05B 2270/709
See application file for complete search history.

(56) References Cited

U.S. PATENT DOCUMENTS

| | | | |
|---|---|---|---|
| 8,987,929 | B2 | 3/2015 | Jayant |
| 9,512,820 | B2* | 12/2016 | Obrecht ................ F03D 7/0204 |
| 2007/0124025 | A1 | 5/2007 | Schram et al. |
| 2009/0099702 | A1* | 4/2009 | Vyas ..................... F03D 7/0292 |
| | | | 290/55 |
| 2011/0135473 | A1* | 6/2011 | Singamsetti ....... G05B 23/0272 |
| | | | 416/61 |
| 2012/0059638 | A1 | 3/2012 | Garate Alvaro |
| 2012/0226485 | A1 | 9/2012 | Creagh et al. |
| 2013/0144449 | A1 | 6/2013 | Dalsgaard et al. |

FOREIGN PATENT DOCUMENTS

| | | |
|---|---|---|
| CN | 109973330 A | 7/2019 |
| EP | 1 790 851 A2 | 5/2007 |
| EP | 2 788 620 A1 | 10/2014 |
| EP | 2 788 620 B1 | 10/2017 |
| WO | 2013/083131 A1 | 6/2013 |
| WO | 2016176064 A1 | 11/2016 |

* cited by examiner

METHOD FOR COMPUTER-IMPLEMENTED CONTROLLING OF ONE OR MORE WIND TURBINES IN A WIND FARM

CROSS-REFERENCE TO RELATED APPLICATIONS

This application claims priority to PCT Application No. PCT/EP2021/055525, having a filing date of Mar. 4, 2021, which claims priority to EP Application No. 20164173.5, having a filing date of Mar. 19, 2020, the entire contents both of which are hereby incorporated by reference.

FIELD OF TECHNOLOGY

The following relates to a method for computer-implemented controlling of one or more wind turbines in a wind farm. The following also relates to a method and a system for computer-implemented controlling of one or more wind turbines in a wind farm where the wind farm comprises an upstream first wind turbine and a downstream second wind turbine.

BACKGROUND

As known to the skilled people, wind turbines of wind farms comprise an upper section with a rotor and a nacelle on the top of a tower, where the upper section can be rotated around a vertical yaw axis in order to vary the yaw angle of the respective turbine. The yaw angle of a wind turbine is usually adjusted such that the rotor of the wind turbine faces the wind. To do so, wind sensors (i.e., anemometers) are installed on the respective wind turbines to estimate the wind direction. Generally, to maximize the production of electric energy in the wind farm, a yaw misalignment shall be avoided. Hence, the wind turbines are controlled such that a yaw misalignment angle is as small as possible.

There are environmental events, such as gust or wave, which require an immediate controlling of the wind turbines, such as a hard shutdown in order to avoid exceeding critical loads and resulting component failures. However, hard shutdowns result in extensive loads to the turbine and can reduce the overall lifetime.

EP 2 788 620 B1 discloses a method for warning a wind turbine generator in a wind park of an extreme wind event. The wind park includes a group of one or more WTGs of a first type located in an inner region of the wind park and a plurality of WTGs of a second type located in an outer region of the wind park that at least partially surrounds the inner region. The first type of WTG is structurally weaker and/or rated for higher performance than the second type of WTG.

EP 1 790 851 A2 discloses a method and system for controlling a wind park power plant includes a central processing and control unit operatively coupled to wind turbines in the wind park to receive and transmit data and control signals to each wind turbine, to reduce fatigue loads and comply with power limits.

SUMMARY

An aspect relates to an easy method in order to avoid extensive loads to the turbines of a wind farm in case of an environmental event, such as gust or wave.

The following provides a method for computer-implemented controlling of one or more wind turbines in a wind farm. The wind farm comprises an upstream first wind turbine and a downstream second wind turbine, i.e., a pair of first and second wind turbines. The method is applied to this pair and may also be applied to several of such pairs. Alternatively, the method is applied to one or more upstream first wind turbines and two or more downstream second wind turbines. Each of the first and the second wind turbines comprise an upper section on top of a tower, the upper section being pivotable around a vertical yaw axis and having a nacelle and a rotor with rotor blades. The rotor is attached to the nacelle and the rotor blades are rotatable by wind around a horizontal rotor axis.

According to the method, the following steps i) to v) are performed at each time point of one or more time points during the operation of the wind farm.

In step i), environmental data and stress data of the first wind turbine are obtained. In the following, the terms "environmental data" and/or "stress data" refer to digital data. The term "obtaining environmental data and stress data" means that the data are received by a computing unit implementing the method. The environmental data and the stress data are current data (i.e., up-to-date data) taken by one or more first sensors installed at the first wind turbine. The term "sensor" refers to any sensing device being configured to acquire environmental data, such as wind information, temperature and so on, or operational data of the wind turbine, such as rotational speed, yaw angle, pitch angle, strain, vibrations of the tower, vibrations of the nacelle and so on. The acquired environmental data and stress data enable the determination whether actual control parameters of the first wind turbine result in a requested or predetermined performance and are within predetermined load corridors.

In step ii), a status information indicating whether or not a predetermined event is present at the time of taking the environmental data and the stress data is determined based on the acquired environmental data and stress data. The predetermined event requires immediate controlling of the first wind turbine in order to avoid excessive loads on the turbine and resulting component fails.

In step iii), a message is broadcasted into the wind farm in case that the status information indicates the predetermined event. The broadcast message contains as event information at least some of the environmental data and a timestep.

In step iv), the event information whether or not the predetermined event at the first wind turbine will hit the second wind turbine is evaluated on receiving the broadcast message.

In step v), a control command for controlling the second wind turbine is generated to counteract the predetermined event in case the evaluation holds that the predetermined event will hit the second wind turbine.

According to the embodiments of the invention, evaluating the event information consists of or comprises determining a probability value whether the event information is true, wherein generating the control command is initiated only if the probability value exceeds a predetermined probability threshold.

The method of the embodiments of the invention provides an easy and straight forward method for controlling the first and/or the second wind turbine in case the first wind turbine is subject to a predetermined event requiring immediate controlling of the first wind turbine. To do so, acquired environmental data and stress data of the first wind turbine are broadcasted into the wind farm in case that a status information resulting from evaluation of the environmental data and the stress data indicates a predetermined event. If the evaluation holds that the predetermined event will also hit the second wind turbine, countermeasures can be taken by generating a control command which adapts one or more control parameters of the second wind turbine to avoid excessive load and damages.

The method makes use of a communication between the first and the second wind turbine, either directly or indirectly. The method provides a warning system for the second wind turbine by making use of broadcast messages containing all the necessary information to evaluate whether a critical predetermined event is relevant to the own operation of the second wind turbine. In particular, this enables an earlier reaction on critical events. Reduced failure of components, improved performance or extended lifetime will result from that adapted control strategy. As a further advantage, the levelized costs of electricity (LCOE) can be reduced.

Determining a probability value whether the event information is true enhances the correctness of the decision. If the environmental data taken by the first wind turbine is incorrect, for example due to a failure in a sensor, this would lead to a wrong and undesired control command. By introducing a probability value obvious defects of the environmental data can be considered.

In embodiments, the message contains a wind direction and a wind speed as the environmental data. Knowledge of wind direction and wind speed enables in conjunction with a timestamp an evaluation whether or not the predetermined event at the first wind turbine will hit the second wind turbine in the near future.

According to a further embodiment, determining the status information is executed by a computing unit of the first wind turbine. The computing unit of the first wind turbine processes the environmental data and the stress data to determine the status information indicating whether or not a predetermined event is present at the time of taking the environmental data and the stress data. This corresponds to the usual behavior of the wind turbine which processes available information to control the wind turbine by its own. In addition to this usual behavior, the first wind turbine broadcasts the message into the wind farm. The information contained in the broadcast message enables the receiver to evaluate whether or not the predetermined event at the first wind turbine will hit the second wind turbine.

In an alternative embodiment, determining the status information is executed by a central computing unit. According to this embodiment, the acquired environmental data and stress data are transmitted by a broadcast message or a unicast message to the central computing unit which determines, based on the environmental data and the stress data, the status information. The central computing unit may be a computing unit of the wind farm or any other computing unit in a cloud.

In a further embodiment, broadcasting the message into the wind farm is executed by a transmitting unit of the first wind turbine. The transmitting unit may be a communication unit which is either configured to only transmit data or configured to transmit and receive data (i.e., configured as a transceiver).

In a further embodiment, evaluating the event information is executed by a computing unit of the second wind turbine. The broadcast message is received by the second wind turbine which evaluates the event information of the broadcast message itself and generates a control command with control parameters for controlling the second wind turbine in case the evaluation holds that the predetermined event will hit the second wind turbine. According to this embodiment, an analysis of available data is made directly at the second wind turbine. It defines a reasonable response by itself. This may be beneficial as real-time reaction is required. In addition, this embodiment does not require a network connection to the cloud as well as processing capabilities in the cloud. Instead, the second wind turbine takes all information, processes it and defines the best response. As powerful hardware is nowadays available to perform so-called edge computation, real-time computing is available. Executing the evaluation of the event information by the central computing unit has the advantage of powerful processing units of these controlling units. However, it must be ensured that all information is exchanged between the first wind turbine and the second wind turbine in real-time.

In an alternative embodiment, evaluating the event information is executed by a computing unit of the central computing unit. According to this embodiment, the event information is received and evaluated by the central computing unit. A control command with control parameters for controlling the second wind turbine is generated by the central computing unit in case the evaluation holds that the predetermined event will hit the second wind turbine. According to this embodiment, computational power of the central computing unit can be used.

According to a further embodiment, evaluating the event information consists of or comprises determining the period of time, starting from the time of having determined the predetermined event at the first wind turbine until the predetermined event will hit the second wind turbine. According to the determined period of time, suitable countermeasures may be taken. The determination of the period of time until the predetermined event will hit the second wind turbine can be calculated from the timestamp, the wind direction, the windspeed information and the known distance between the first wind turbine and the second wind turbine.

The probability is based on "historic" information about the trustworthiness of a turbine. For example, the sensors readings over time can be analyzed by the turbine sending the event and this information can be part of the broadcasted message. E.g., if there is a sudden (unphysical) jump in a sensor reading, it can send the event message together with the information that this is likely to be a sensor error and thus not relevant to the receiver, i.e., the second wind turbine or the central computing unit. It also could be implemented that the receiver keeps track of events and the actual importance of events. If the broadcasting turbine, i.e., the first wind turbine, sends a signal that turns out to be not relevant to the receiver, the receiver lowers the trustworthiness (probability) of the sender.

According to a further embodiment, evaluating the event information and/or generating the control command is based on processing the event information according to a predetermined map. Using a predetermined map is based on knowledge, if and how the second wind turbine reacts on the environmental information within the broadcast message. The reaction is kind of "hard-coded" in the map. In other words, control commands are defined in advance with respect to every possible situation (event). This is a classical way to define control strategies. According to an alternative embodiment, evaluating the event information is based on processing the event information by a trained data driven model, where the event information is fed as a digital input to the trained data driven model and the trained data driven model provides the information whether or not the predetermined event of the first wind turbine will hit the second wind turbine as a digital output. Any known data driven model being learned by machine learning may be used in the method according to the embodiments of the invention.

In an embodiment, the trained data driven model is a neural network, a recurrent neural network. Nevertheless, other trained data driven models may also be implemented in the method of the embodiments of the invention, e.g., reinforcement learning. Every time, the second wind turbine receives a broadcast message, it has to make a decision whether the information in the broadcast message has to be considered for its control strategy. The second wind turbine stores all its reactions or not-reactions and knows retrospectively if a decision was good or bad. Thus, the second wind turbine can learn from its experiences of previous events and takes this into account for further operation. Such a reinforcement learning can also be applied on a central computing unit.

According to a further embodiment, the control command consists of or comprises at least one of the following countermeasures: shutdown; soft-shutdown; adjusting a yaw angle; adjusting a pitch angle. Furthermore, combinations of the countermeasures may be applied. The shutdown and the soft-shutdown differentiate mainly based on the time it takes from triggering a stop command until the turbine is completely stopped. A soft-shutdown allows a smoother ramping down than a hard shutdown. The countermeasures can be initiated by respective control commands generated by the central computing unit or the second wind turbine itself.

Considering the period of time until the predetermined event at the first wind turbine will hit the second wind turbine, those countermeasures can be chosen which have a minimized effect on negative loads. Such countermeasures are more "friendly" to the second wind turbine and its components, so that the lifetime of the components can be extended.

According to a further embodiment, the control command is generated by the second wind turbine. Alternatively, the control command is generated by the central computing unit, wherein the control command is transmitted by a broadcast message or a unicast message to the second wind turbine.

Besides the above method, the embodiments refer to a system for computer-implemented controlling of one or more wind turbines in a wind farm, where the system is configured to perform the method according to embodiments of the invention or one or more embodiments of the method according to embodiments of the invention.

Moreover, the embodiments refer to a computer program product (non-transitory computer readable storage medium having instructions, which when executed by a processor, perform actions) with a program code, which is stored on a non-transitory machine-readable carrier, configured for carrying out the method according to the embodiments of the invention or one or more embodiments thereof when the program code is executed on a computer.

Furthermore, the embodiments refer to a computer program with a program code for carrying out the method according to the one or more embodiments thereof when the program code is executed on a computer.

BRIEF DESCRIPTION

Some of the embodiments will be described in detail, with reference to the following figures, wherein like designations denote like members, wherein.

DETAILED DESCRIPTION

Figure 1:
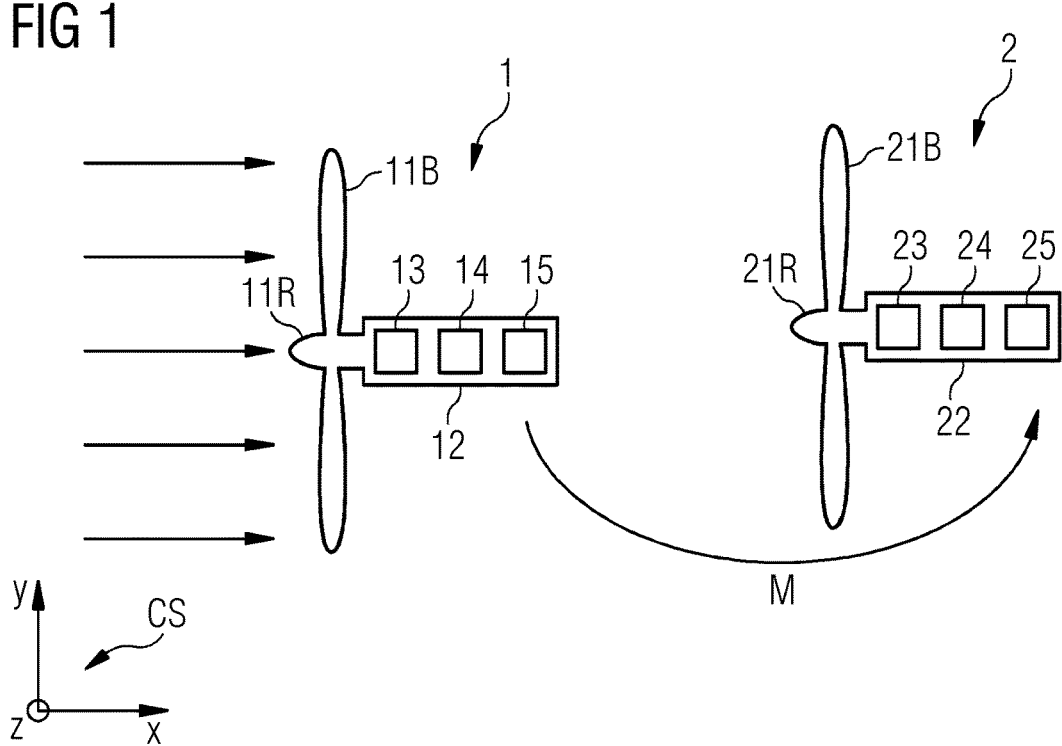
FIG. 1 shows a schematic illustration of a wind farm for performing a first embodiment of the invention.

FIG. 1 shows a wind farm comprising an upstream first wind turbine 1 and a downstream second wind turbine 2 in a view from above. The wind farm may have more than those two wind turbines. The method described herein is applied to the first and the second wind turbines 1 and 2. Nevertheless, the method may also be applied to other pairs of wind turbines being part of the wind farm or one or more upstream first wind turbines and one or more downstream second wind turbines.

The wind turbines 1, 2 are shown in plan view from above. A 3D coordinate system CS for indicating the spatial arrangement of the wind turbines is part of FIG. 1. The vertical direction is indicated by the z-axis of the coordinate system CS whereas the directions parallel to the horizontal direction are indicated by the x-axis and y-axis of the coordinate system CS. The wind direction is along the x-axis of the coordinate system CS.

Wind turbine 1 which is an upstream turbine with respect to the wind direction comprises an upper section being located on top of a tower (not shown) which extends in the vertical z-direction. The upper section comprises a nacelle 12 accommodating an electric generator for generating electricity. Furthermore, the upper section comprises a rotor 11R having three rotor blades 11B with an angle of 120° therebetween where FIG. 1 only shows two of those blades. The rotor 11R is rotated around the horizontal rotor axis by wind resulting in the generating of electricity by the generator within the nacelle 12. The upper section of the wind turbine 1 can be pivoted around the vertical yaw axis extending in z-direction.

Wind turbine 1 is equipped with a plurality of sensors 13, where in the schematic illustration only one sensor 13 is shown. The number of sensors 13 consists of sensors for acquiring environmental data ED, such as temperature, wind speed, wind direction, and stress data SD, such as mechanical loads, strain, vibrations of the tower, vibrations of the nacelle, and so on. In addition, wind turbine 1 comprises a computing unit 14 and a transmitting unit 15. The transmitting unit 15 may be a transceiver configured to be able to receive data as well.

Wind turbine 2 which is located downstream with respect to the wind direction has the same construction as wind turbine 1. I.e., wind turbine 2 comprises an upper section located at the top of a vertical tower (not shown), the section comprising a nacelle 22 accommodating a generator as well as a rotor 21R attached to the nacelle 22. Due to the rotation of the rotor 21R by wind around the horizontal rotor axis, electricity is generated by the generator within the nacelle 22. Analogously to wind turbine 1, wind turbine 2 can be pivoted around a vertical yaw axis.

Wind turbine 2 is equipped with a plurality of sensors 23, where in the schematic illustration only one sensor 23 is shown. The number of sensors 23 consists of sensors for acquiring environmental data ED, such as temperature, wind speed, wind direction, and stress data SD, such as mechanical loads, strain, vibrations of the tower, vibrations of the nacelle, and so on. In addition, wind turbine 2 comprises a computing unit 24 and a receiving unit 25. The receiving unit 25 may be a transceiver configured to be able to transmit data as well.

Data exchange from the transmitting unit 15 of wind turbine 1 to the receiving unit 25 of wind turbine 2 may be wired or wireless.

In case of an environmental event, such as gust or wave, at first the upstream wind turbine 1 is hit by the wind and after a period of time which is dependent from wind direction, wind speed and the distance between the wind turbines 1, 2 wind turbine 2 is hit by that environmental event as well. The environmental event may be such that each of the computing units 14, 24 of the first and the second wind turbines 1, 2 may have to adapt their control strategy to avoid excessive loads and component fails of the wind turbines 1, 2. An immediate reaction might be a hard shutdown immediately after the environmental data ED and stress data SD have been acquired by the one or more sensors 13, 23 of the respective wind turbines 1, 2.

The method as described in the following provides an easy method to use acquired sensor data taken from the one or more sensors 13 of the upstream wind turbine 1 for controlling the downstream second wind turbine 2 to enable the second wind turbine 2 to avoid excessive loads due to the environmental event and hard control strategies.

To do so, environmental data ED and stress data SD are obtained, where the environmental data ED and the stress data SD are current data being taken by the one or more sensors 13 installed at the first wind turbine 1. The environmental data ED and the stress data SD are fed as a digital input to the computing unit 14 of the first wind turbine 1. The computing unit 14 determines, based on the environmental data ED and the stress data SD, a status information STI which indicates whether or not a predetermined event is present at the time of taking the environmental data ED and the stress data SD. The term "predetermined event" corresponds to an environmental event which requires immediate controlling of first wind turbine 1 to avoid extreme loads and resulting component fails, such as gust or wave.

In case that the status information STI indicates the predetermined event, a message M is transmitted from the transmitting unit 15 as a broadcast message into the wind farm. The message M contains an event information EVI. The event information EVI consists of or comprises a timestamp TS at the time of acquiring the environmental data ED and the stress data SD characterizing the predetermined event and at least some of the environmental data ED. In particular, a wind speed WS and wind direction are used as event information EVI.

The broadcast message M is received by the receiving unit 25 of the second wind turbine 2. The message is forwarded from the receiving unit 25 to the computing unit 24, where it is evaluated. The evaluation consists of or comprises processing the event information whether or not the predetermined event at the first wind turbine 1 will hit the second wind turbine 2 as well. This information can be taken from the wind speed, the wind direction and the known distance between the first and the second wind turbines 1, 2, where the latter enables determining the period of time, starting from the time of having determined the predetermined event at the first wind turbine 1, until the predetermined event will hit the second wind turbine 2.

In case that the evaluation holds that the predetermined event will hit the second wind turbine 2, a control command CO is generated for controlling the second wind turbine 2 such that the predetermined event can be counteracted. The control command may consist of or may comprise control parameters suitable for initiating a shutdown, a soft-shutdown, an adjustment of the yaw angle and/or an adjustment of the pitch angle. In addition, further countermeasures or combinations thereof can be taken. If the determined period of time until the predetermined event hits the second wind turbine is long enough that a soft-shutdown is possible, control commands CO can be initiated before the predetermined event reaches the second wind turbine 2. A soft-shutdown, for example, is much more friendly to the wind turbine and its components, so that the lifetime of the components can be extended.

If the evaluation of the event information has the result that the predetermined event will not cause extreme loads but can be used to increase performance, control commands CO can be generated such that the performance is increased, for example by early adapting a pitch angle. Generation of control commands CO may be hard-coded, i.e., the evaluation of the event information and/or generation of the control command is based on processing the event information according to a predetermined map. Such a map consists of or comprise possible reactions to every possible situation. Alternatively, the evaluation may be based on processing the event information by a trained data driven model, where the event information is fed as a digital input to the trained data driven model and the trained data driven model provides the information whether or not the predetermined event at the first wind turbine will hit the second wind turbine as a digital output. The trained data driven model can be based, for example, on reinforcement learning or deep learning.

As for reinforcement learning, every time a turbine reads a broadcast message, it has to decide to take into account the event information for its control or not. The second wind turbine stores all its reactions or non-reactions and knows retrospectively if a decision was good or bad. Thus, it can learn from experiences of previous events and take this into account for further, future operation.

Alternatively, the second wind turbine can take the information of previous events, its reactions and the outcome, i.e., used control commands and strategies. This information can be fed to a machine learning algorithm, e.g., a neural network. The second wind turbine learns the best behavior to certain events. This learning might have to be repeated once in a while to update the algorithm with recent information.

Figure 2:
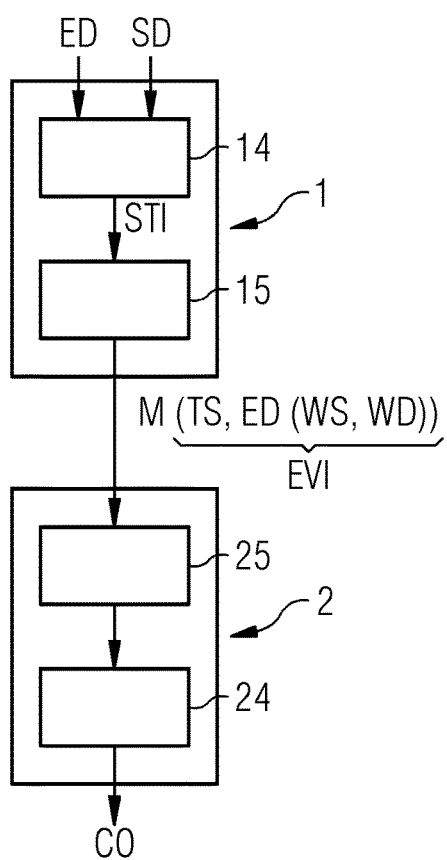
FIG. 2 shows a schematic illustration of the method performed by the wind farm according to the first embodiment of the invention.

While the first example shown in FIGS. 1 and 2 is based on a direct analysis of the information at the first and the second wind turbines 1,2, where reasonable responses to the predetermined events are defined by the second wind turbine 2 itself, a cloud-based or centralized procedure may be possible as well. In the embodiment according to FIGS. 1 and 2, no network connection to the cloud is required nor any processing in the cloud. Hence, real-time reactions can be guaranteed. The second wind turbine 2 takes all information, processes it and defines the best response for itself.

Figure 3:
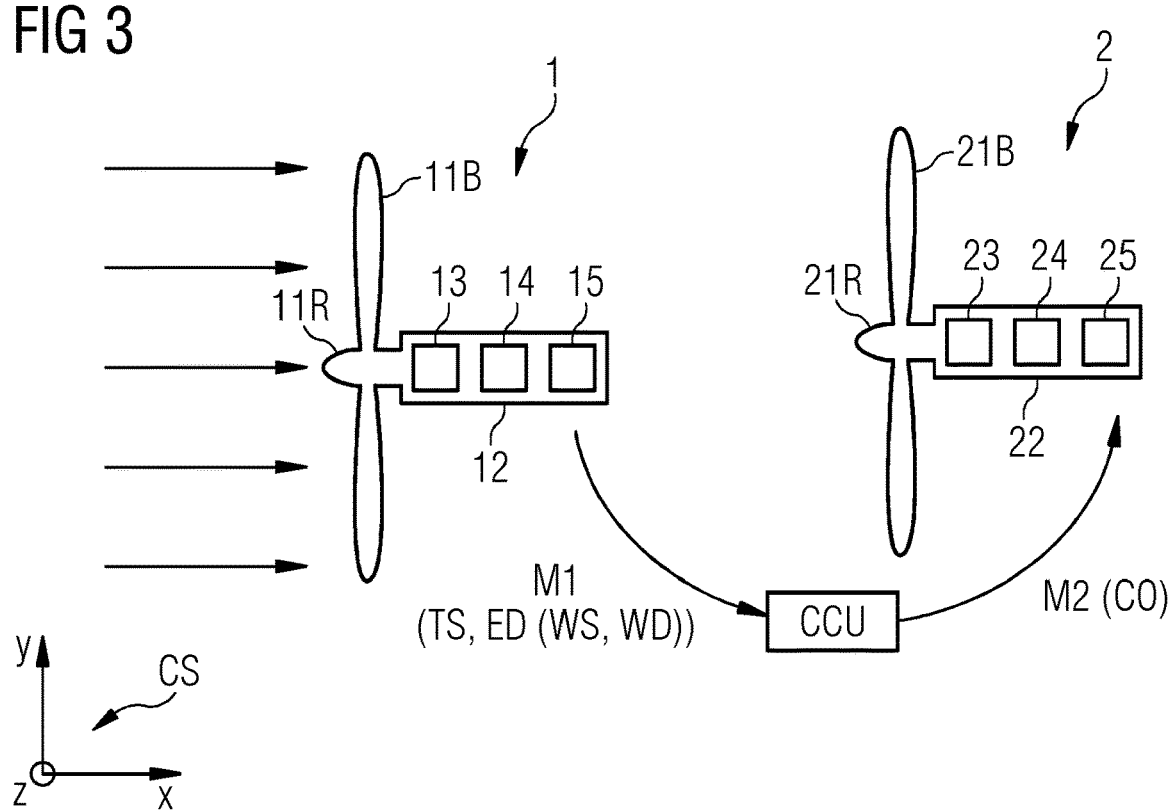
FIG. 3 shows a schematic illustration of a wind farm for performing a second embodiment of the invention.
Figure 4:
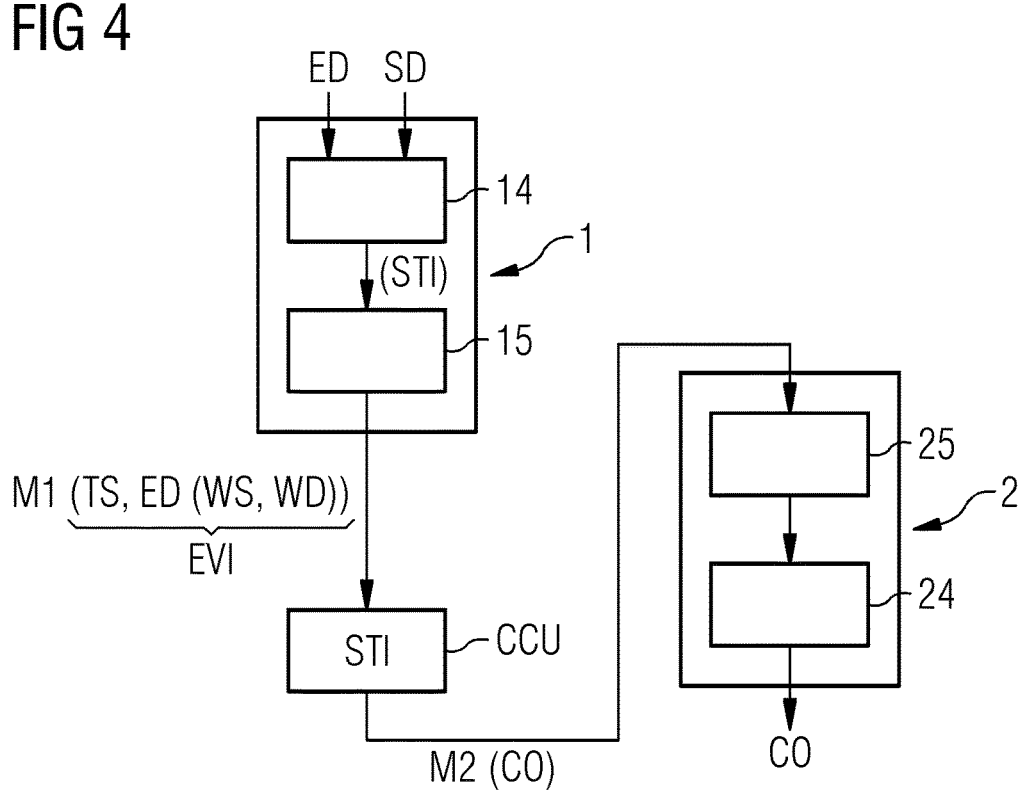
FIG. 4 shows a schematic illustration of the method performed by the wind farm according to the second embodiment of the invention.

The cloud-based procedure is shown in the second embodiment according to FIGS. 3 and 4. FIG. 3 corresponds to a first embodiment according to FIG. 1 with the exception that there is no direct communication between the first and the second wind turbines 1, 2. Instead, a central computing unit CCU is involved in the communication from wind turbine 1 to wind turbine 2.

According to the second embodiment, a message M1 containing the timestamp TS and the environmental information EVI consisting of or comprising wind speed WS and wind direction WD of the environmental data ED is transmitted from the transmitting unit 15 of the first wind turbine 1 to the central computing unit CCU (FIG. 4). The central computing unit CCU determines the status information STI indicating whether or not the predetermined event is present at the time of taking the environmental data ED and the stress data SD of the first wind turbine 1. Alternatively, the status information STI may be determined by the first wind turbine 1 and also be part of the message M1.

Furthermore, the central computing unit CCU evaluates the event information EVI whether or not the predetermined event at the first wind turbine 1 will hit the second wind turbine 2. In case that the evaluation holds that the predetermined event will hit the second wind turbine 2, a control command CO is generated and transmitted via a message M2 to the receiving unit 25 of the second wind turbine 2. The wind turbine 2 therefore does not have to evaluate the event information EVI by itself but directly receives control commands CO instead.

Alternatively, the central computing unit CU can forward the event information EVI to the second wind turbine 2 in case that the evaluation holds that the predetermined event will hit the second wind turbine 2. The computing unit 24 of the second wind turbine 2 will then generate a control command CO for controlling the second wind turbine to counteract the predetermined event based on the event information EVI.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented controlling of one or more wind turbines in a wind farm, wherein the wind farm comprises an upstream first wind turbine and a downstream second wind turbine, wherein at each time point of one or more time points the following steps are performed:
   i) obtaining environmental data and stress data of the first wind turbine, the environmental data and the stress data being current data being taken by one or more sensors installed at the first wind turbine;
   ii) determining, based on the environmental data and the stress data, a status information indicating whether or not a predetermined event is present at the time of taking the environmental data and the stress data, wherein the predetermined event requires immediate controlling of the first wind turbine;
   iii) broadcasting a message into the wind farm in case that the status information indicates the predetermined event, wherein the message contains as event information at least some of the environmental data and a timestamp;
   iv) evaluating, on receiving the broadcast message, the event information whether or not the predetermined event at the first wind turbine will hit the second wind turbine;
   v) generating a control command for controlling the second wind turbine to counteract the predetermined event in case the evaluation holds that the predetermined event will hit the second wind turbine and controlling the second wind turbine with the control command; and
   wherein evaluating the event information comprises determining a probability value whether the event information is true, wherein generating the control command is initiated only if the probability value exceeds a predetermined probability threshold;
   further wherein the control command comprises at least one of the following countermeasures: shutdown, soft-shutdown, adjusting a yaw angle, and adjusting a pitch angle.

2. The method according to claim 1, wherein the message contains a wind direction and a wind speed as the environmental data.

3. The method according to claim 1, wherein determining the status information is executed by a computing unit of the first wind turbine or a central computing unit.

4. The method according to claim 1, wherein broadcasting the message into the wind farm is executed by a transmitting unit of the first wind turbine.

5. The method according to claim 1, wherein evaluating the event information is executed by a computing unit of the second wind turbine or a central computing unit.

6. The method according to claim 1, wherein evaluating the event information comprises determining a period of time, starting from the time of having determined the predetermined event at the first wind turbine until the predetermined event will hit the second wind turbine, and wherein the control command is selected to have a minimized effect on negative loads based on the period of time.

7. The method according to claim 1, wherein evaluating the event information and/or generating the control command is based on processing the event information according to a predetermined map.

8. The method according to claim 1, wherein evaluating the event information is based on processing the event information by a trained data driven model, where the event information is fed as a digital input to the trained data driven model and the trained data driven model provides the information whether or not the predetermined event at the first wind turbine will hit the second wind turbine as a digital output.

9. The method according to claim 1,
   wherein the shutdown and the soft-shutdown differentiate mainly based on the time it takes from triggering a stop command until the second wind turbine is completely stopped;
   wherein the soft-shutdown includes a ramping down;
   wherein the at least one countermeasure is chosen such that an effect on negative loads is minimized; and/or
   wherein choosing the at least one countermeasure comprises considering a period of time until the predetermined event at the first wind turbine hits the second wind turbine.

10. The method according to claim 1, wherein the control command is generated by the second wind turbine.

11. The method according to claim 1, wherein the control command is generated by a central computing unit, wherein the control command is transmitted by a broadcast control message or a unicast control message to the second wind turbine.

12. A computer program product, comprising a computer readable hardware storage device having computer readable program code stored therein, said program code executable by a processor of a computer system to implement a method with program code, which is stored on a non-transitory machine-readable carrier, configured for carrying out a method according to claim 1 when the program code is executed on a computer.

13. A system for computer-implemented monitoring of one or more wind turbines in a wind farm where the wind farm comprises an upstream first wind turbine and a downstream second wind turbine, wherein the system is configured to perform, at each time point of one or more time points, an operation comprising:
  i) obtaining environmental data and stress data of the first wind turbine, the environmental data and the stress data being current data being taken by one or more sensors installed at the first wind turbine;
  ii) determining, based on the environmental data and the stress data, a status information indicating whether or not a predetermined event is present at the time of taking the environmental data and the stress data, wherein the predetermined event requires immediate controlling of the first wind turbine;
  iii) broadcasting a message into the wind farm in case that the status information indicates the predetermined event, wherein the message contains as event information at least some of the environmental data and a timestamp;
  iv) evaluating, on receiving the broadcast message, the event information whether or not the predetermined event at the first wind turbine will hit the second wind turbine;
  v) generating a control command for controlling the second wind turbine to counteract the predetermined event in case the evaluation holds that the predetermined event will hit the second wind turbine and controlling the second wind turbine with the control command; and wherein, in the step (iv) of evaluating the event information, the system is further configured to determine a probability value whether the event information is true, wherein generating the control command is initiated only if the probability value exceeds a predetermined probability threshold;

further wherein the control command comprises at least one of the following countermeasures: shutdown, soft-shutdown, adjusting a yaw angle, and adjusting a pitch angle.

14. A wind farm comprising a first wind turbine and a second wind turbine, wherein the wind farm comprises a system according to claim 13.

* * * * *